(12) United States Patent
Tsai

(10) Patent No.: US 6,185,053 B1
(45) Date of Patent: Feb. 6, 2001

(54) RESOLUTION ADJUSTING DEVICE

(75) Inventor: Jenn-Tsair Tsai, Hsinchu (TW)

(73) Assignee: Mustek Systems, Inc., Hsinchu (TW)

(*) Notice: Under 35 U.S.C. 154(b), the term of this patent shall be extended for 0 days.

(21) Appl. No.: 09/037,167

(22) Filed: Mar. 9, 1998

(30) Foreign Application Priority Data

Sep. 12, 1997 (TW) .............................................. 86215660

(51) Int. Cl.$^7$ ................................................ G02B 7/02
(52) U.S. Cl. ..................... 359/823; 359/819; 250/201.7
(58) Field of Search .................... 359/823, 822, 359/819; 250/201.7

(56) References Cited

U.S. PATENT DOCUMENTS

| | | | |
|---|---|---|---|
| 4,560,864 | 12/1985 | Kinoshita et al. | 250/201 |
| 5,969,346 | * 10/1999 | Nagasaka et al. | 250/254 |

* cited by examiner

*Primary Examiner*—Georgia Epps
*Assistant Examiner*—Timothy Thompson
(74) *Attorney, Agent, or Firm*—Alston & Bird LLP

(57) ABSTRACT

A device for adjusting a resolution of an image-pickup apparatus in horizontal and vertical directions is disclosed. The resolution adjusting device includes a diagonal pattern for providing an image to be received by the photoelectric conversion device to obtain an adjusted resolution by adjusting a position of the focusing device according to the image.

7 Claims, 6 Drawing Sheets

RESOLUTION ADJUSTING DEVICE

FIELD OF THE INVENTION

The present invention is related to a resolution adjusting device, and more particularly to a device for adjusting a resolution of an image scanning apparatus in horizontal and vertical directions.

BACKGROUND OF THE INVENTION

At the present time, a ruler 11 with a pattern of vertical lines 12 (having a certain line pairs per minimeter, lp/min) is often used as a target to adjust the focus of the lens in the scanner as shown in FIG. 1. However, there is a higher resolution in the horizontal direction but a lower resoluion in the vertical direction resulting from using the pattern of vertical lines of the ruler 11.

Please refer to FIG. 2 showing a theoretical diagram of the characteristic of a general lens. X specifies the resolution in the horizontal direction and Y specifies the resolution in the vertical direction. The ruler 11 provides an image to be received by a charge coupled device (CCD) for adjusting the focus of the lens in the scanner. During the process of adjusting the lens, the resolution of the image in the horizontal direction is not in accordance with that in the vertical direction. As shown in FIG. 2, the point A is the best point of the horizontal resolution. The modulation transport function (MTF) of the horizontal direction is about 0.35 but that of the vertical direction is only 0.04 (the MTF is proportional to the resolution). On the other hand, the point E is the preferable point of the vertical resolution, wherein the MTF in the horizontal direction is about 0.24 but that in the vertical direction is only 0.1. However, the desired point should be the point B rather than the extreme point A or E. The resolution of the lens is often focused on the point A by using the ruler 11 with a pattern of vertical lines.

FIG. 3 is a real diagram showing the characteristic of the lens. T specifies the best point 31 of the vertical resolution of the image of the subject P after providing an optical signal transmitted through the lens 30, C specifies the best point 32 of the vertical and horizontal resolutions, and S specifies the best point 33 of the horizontal resolution. If the ruler 11 with a pattern of the vertical lines is used as a target, only the horizontal resolution can be adjusted such that the resolution is usually adjusted on the point 33. Therefore, the horizontal resolution of the image is clear but the vertical resolution of the image is vague. The deviation of the horizontal resolution can be calibrated by taking advantage of the pattern of the vertical line so that the horizontal resolution can be adjusted in the best condition. However, the deviation of the vertical direction can not be calibrated. It seems impossible to adjust the resolution on the best point B as shown in FIG. 2.

In order to overcome this defect, the present invention provides a device for adjusting a resolution of an image-pickup apparatus. The focus of the lens can be fastly and exactly adjusted in the range between point C and D according to the characteristic of the lens as shown in FIG. 2 to obtain the best resolution (the point B). Thus, the efficiency for calibrating the optical apparatus can be improved to meet the requirements of high yield rate and low cost.

SUMMARY OF THE INVENTION

An object of the present invention is to provide a device for adjusting a resolution of an image scanning apparatus in horizontal and vertical directions.

According to the present invention, the resolution adjusting device includes a diagonal pattern for providing an image to be received by the photoelectric conversion device of the image scanning apparatus to obtain an adjusted resolution by adjusting a position of the focusing device of the image scanning apparatus according to the image.

In accordance with one aspect of the present invention, the diagonal pattern is formed by a plurality of oblique blocks in different colors.

In accordance with another aspect of the present invention, the plurality of oblique blocks have spaced black and white colors in between.

In accordance with another aspect of the present invention, the diagonal pattern has a plurality of oblique lines therein.

In accordance with another aspect of the present invention, each of the oblique lines and a horizontal line have an included angle ranged from 15° to 85°.

In accordance with another aspect of the present invention, the focusing device includes a lens.

In accordance with another aspect of the present invention, the phtoelectric conversion device includes a charge coupled device (CCD).

The present invention may best be understood through the following description with reference to the accompanying drawings, in which:

DETAILED DESCRIPTION OF THE PREFERRED EMBODIMENT

Figure 4:
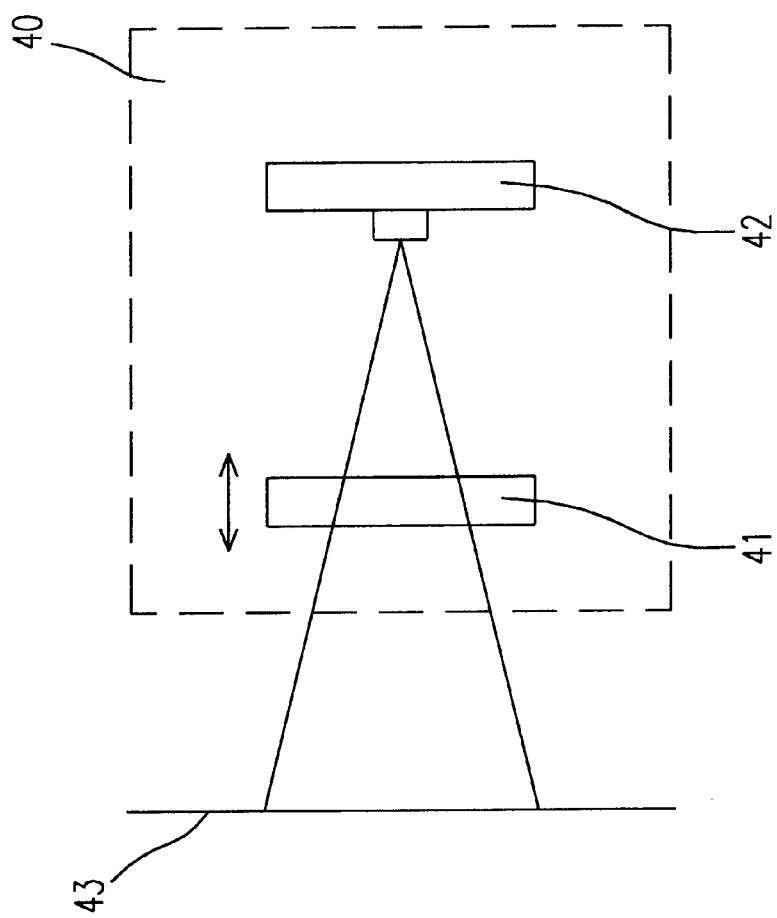
FIG. 4 is a schematic diagram showing the resolution adjusting device and the image scanning apparatus.

Please refer to FIG. 4 showing a resolution adjusting device 43 adapted to be used in the image scanning apparatus including a focusing device 41 and a photoelectric conversion device 42 disposed in the carriage 40 according to the present invention. The resolution adjusting device 43 includes a diagonal pattern. The focusing device 41 can be a lens and the photoelectric conversion device 42 can be a charge coupled device (CCD). The diagonal pattern provides an image to be received by the photoelectric conversion device 42 to obtain an adjusted resolution by adjusting a position of the focusing device 41 according to the image.

Figure 5:
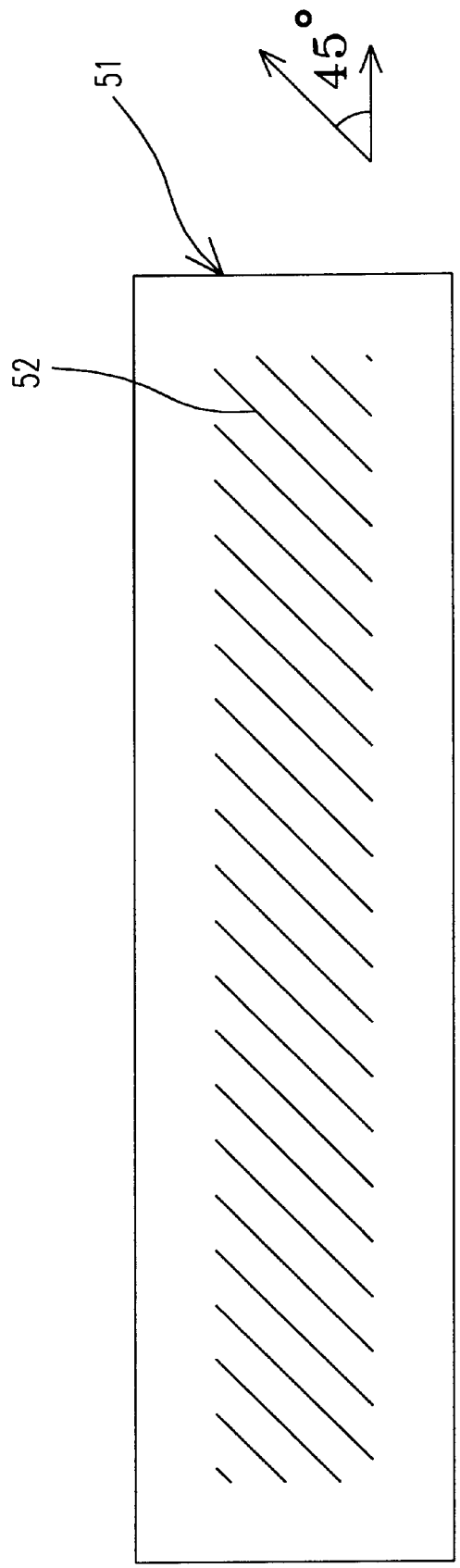
FIG. 5 is a schematic diagram showing a preferred embodiment of a resolution adjusting device having a diagonal pattern according to the present invention.

The resolution adjusting device 51 shown in FIG. 5 is a preferred embodiment of a diagonal pattern of the present invention. The diagonal pattern 52 is formed by a plurality of oblique blocks in different colors. The plurality of oblique blocks preferably has spaced black and white colors in between. The diagonal pattern 52 can also be formed by a pluralty of oblique lines. The cross angle of the oblique line and a a horizontal line, 45°, is the best theoretical angle in the present invention. Actually, the angle can be ranged from 5° to 85°. If the angle of the oblique line is small, the influence on the vertical resolution is more than on the horizontal resolution, and vice versa. On the other hand, the resolution in the vertical direction is easily influenced by the shake resulting from the displacement of the drive motor in addition to the factor of the focusing device 41. Thus, the demand upon the vertical resolution is more strict than on the horizontal resolution in the actual operation.

Figure 6:
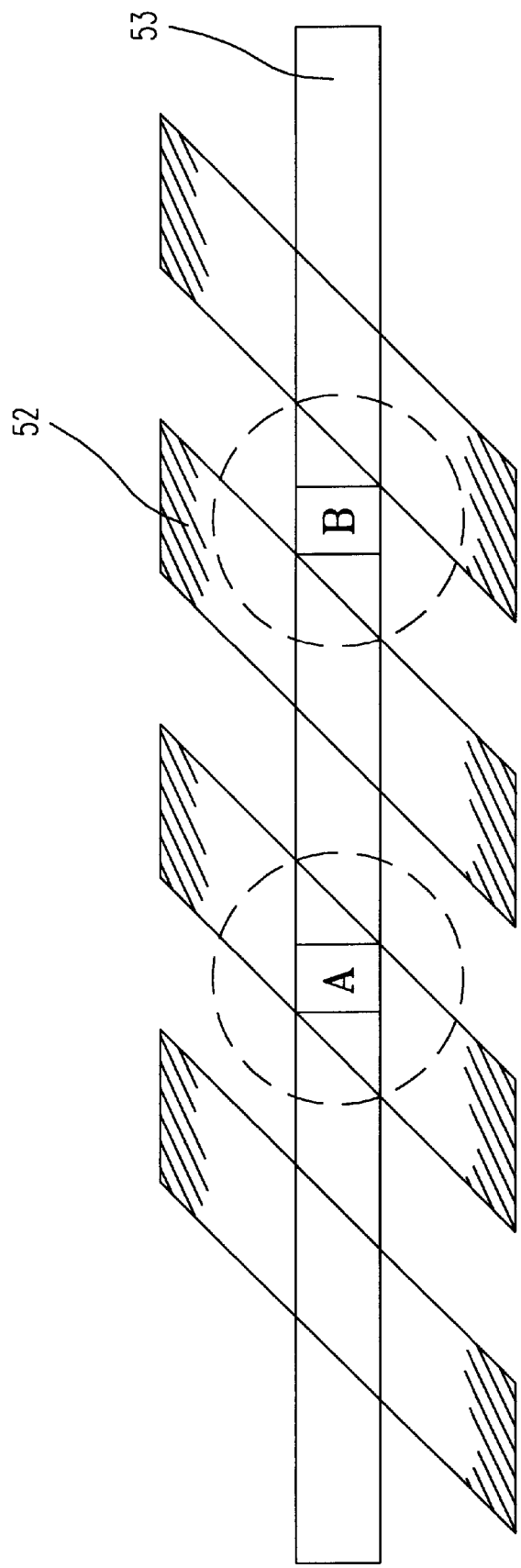
FIG. 6 is a schematic diagram showing a partial amplification of the diagonal pattern shown in FIG. 5.

As shown in FIG. 6, the part A or B of the diagonal pattern 52 is positioned on the scanning line 53 of the photoelectric conversion device before adjusting the resolution. The diagonal pattern 52 whose every two neighbored blocks have different colors is used as a resolution adjusting device. Certainly, the resolution adjusting device according to the present invention can also be used for adjusting the resolutions of different kinds of the optical instruments.

In the design of the oblique pattern, the oblique blocks with the spaced black and white in between is a preferable choice because there is a sharp contrast between these two colors in brightness and darkness. The resolution in the horizontal and vertical directions (X-direction and Y-direction respectively) of the image will be influenced by the contrast between black and white. Certainly, the horizontal and vertical resolutions can be adjusted in the best condition according to the alternate situation of the different colors so that the position of the focusing device can be adjusted to obtain the preferable equilibrium point of the resolution.

Figure 1:
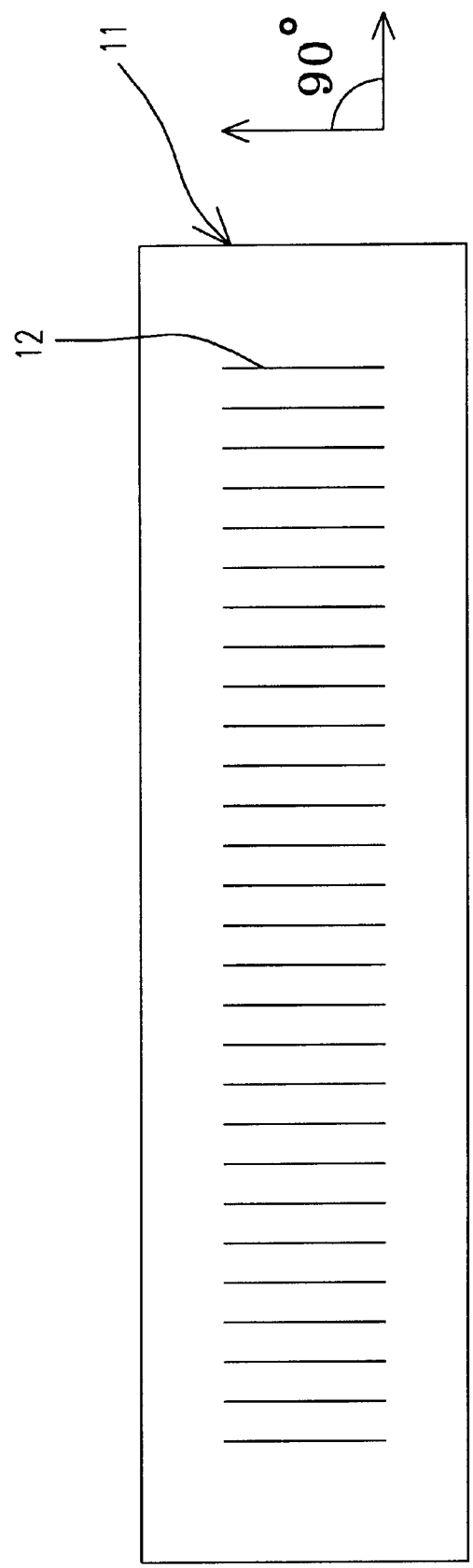
FIG. 1 is a schematic diagram showing a ruler with a pattern of vertical lines.
Figure 2:
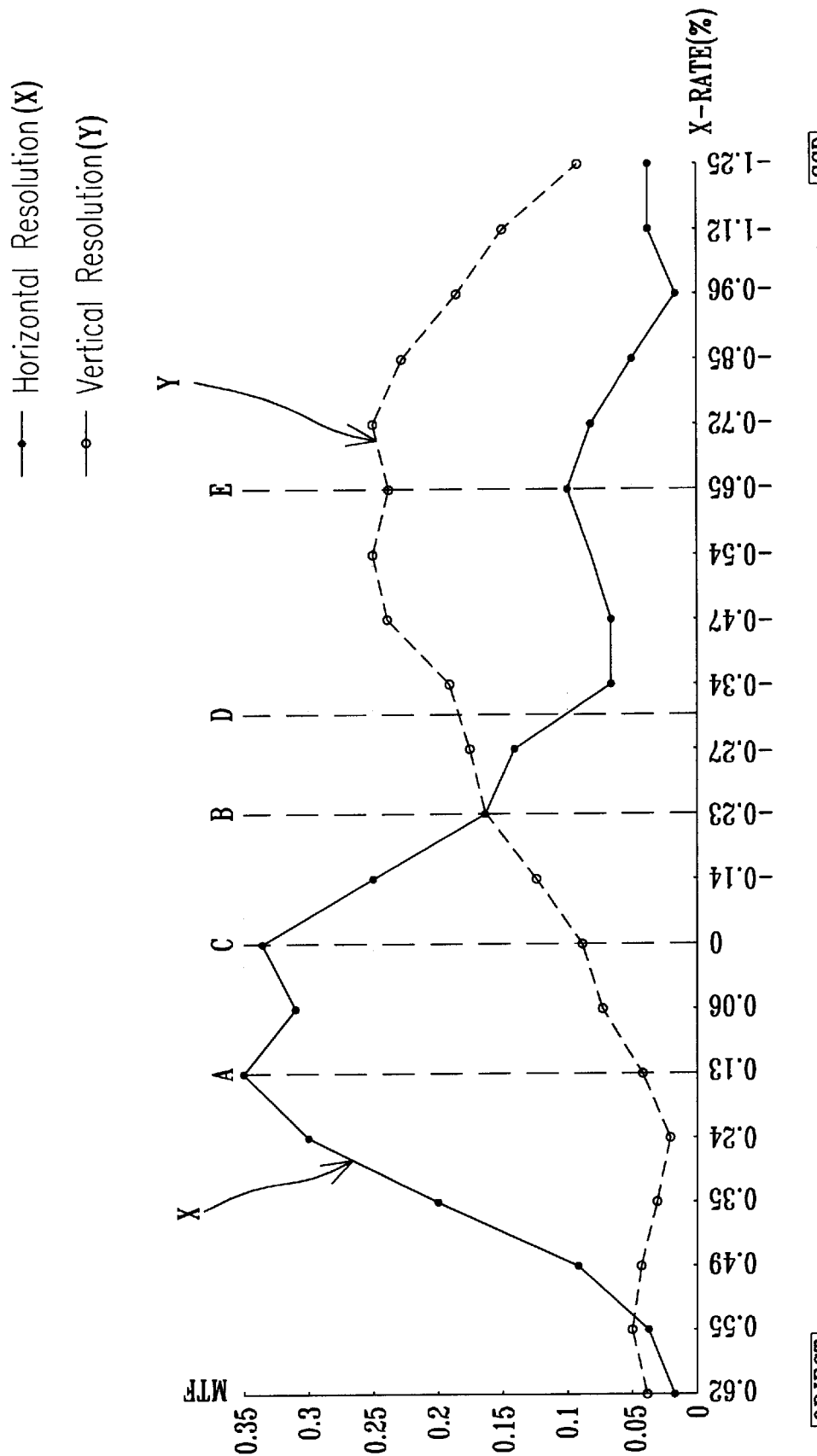
FIG. 2 is a theoretical diagram showing the characteristic of the lens.
Figure 3:
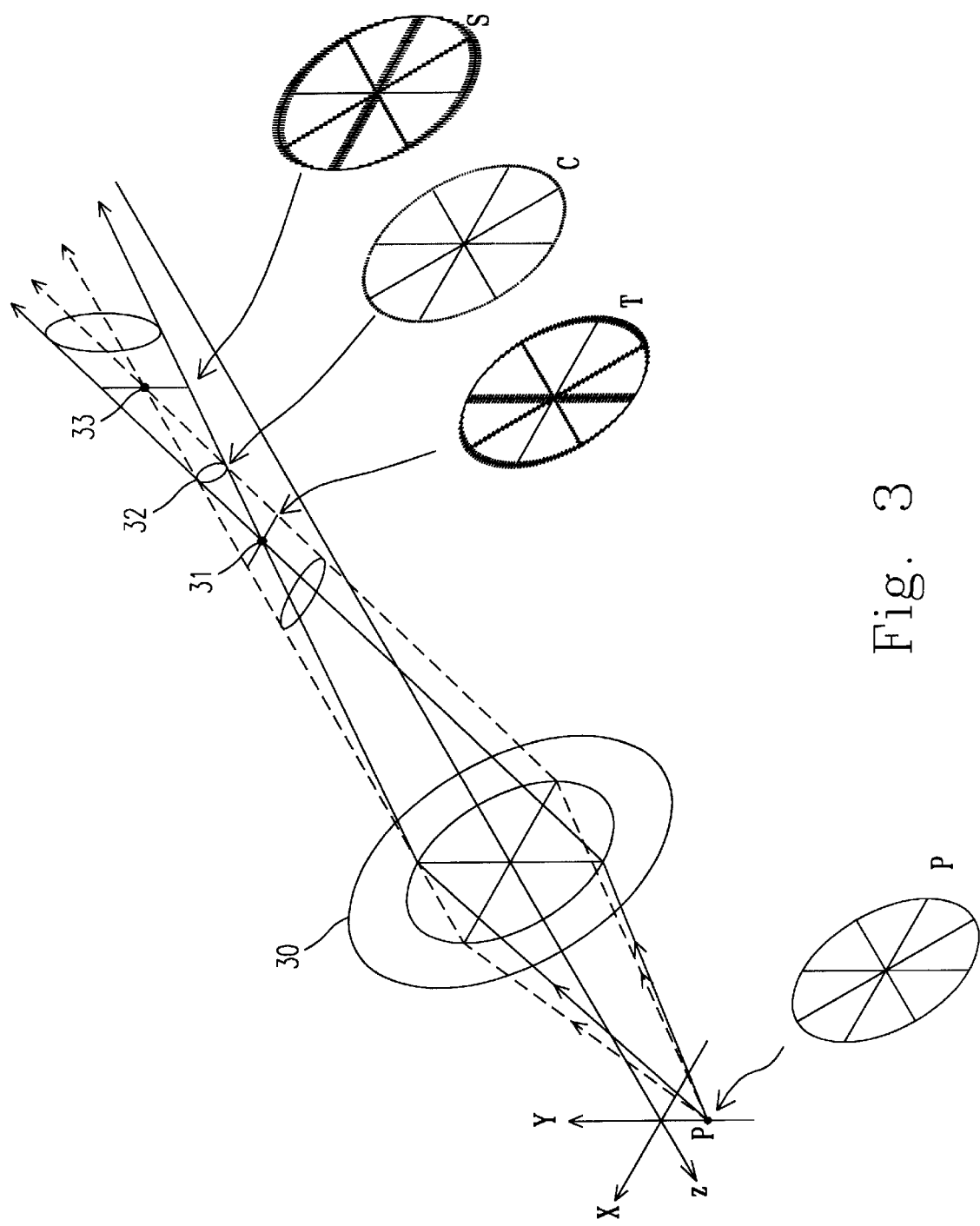
FIG. 3 is a real diagram showing the characteristic of the lens.

The present invention provides a device for adjusting a resolution of an image scanning apparatus. The focus of the lens can be fastly and exactly adjusted in the range between point C and D according to the characteristic of the lens as shown in FIG. 2 and the resolution in horizontal and vertical directions can be adjusted to obtain the equilibrium point. Thus, the efficiency for calibrating the optical apparatus can be improved to meet the requirements of high yield rate and low cost.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A resolution adjusting device positioned on a scanning surface of an image scanning apparatus before adjusting the resolution, wherein said image scanning apparatus has a focusing device and a photoelectric conversion device comprising:

a diagonal pattern for providing an image to be received by said photoelectric conversion device to obtain an equilibrium point of the resolution in the horizontal and vertical directions by adjusting a position of said focusing device according to said image.

2. A device according to claim 1 wherein said diagonal pattern is formed by a plurality of oblique blocks in different colors.

3. A device according to claim 2 wherein said plurality of oblique blocks have spaced black and white colors in between.

4. A device according to claim 1 wherein said diagonal pattern has a plurality of oblique lines therein.

5. A device according to claim 4 wherein each of said oblique lines and a horizontal line have an included angle ranged from 15° to 85°.

6. A device according to claim 1 wherein said focusing device includes a lens.

7. A device according to claim 1 wherein said phtoelectric conversion device includes a charge coupled device (CCD).

* * * * *